United States Patent [19]

Golubev et al.

[11] Patent Number: 4,586,981

[45] Date of Patent: May 6, 1986

[54] METHOD OF CONTINUOUS DECONTAMINATION OF RADIOCONTAMINATED LIQUIDS BY DISTILLATION

[75] Inventors: Evgeny K. Golubev; Alexandr R. Lensky; Evgeny E. Glazov; Vladimir A. Berseniev, all of Moscow; Boris F. Vakulenko; Vasily S. Mikhailov, both of Taganrog; Anatoly A. Shiryaev, Moscow, all of U.S.S.R.

[73] Assignee: Vsesojuzny Nauchno-Issledovatelsky Proektno-Konstruktorsky Institut Atomnogo Energeticheskogo Mashinostroenia, Moscow, U.S.S.R.

[21] Appl. No.: 520,817

[22] Filed: Aug. 5, 1983

[51] Int. Cl.⁴ .............................................. B01D 1/06
[52] U.S. Cl. ........................... 159/47.1; 159/DIG. 12; 159/27.1; 202/173; 202/184; 202/197; 202/237; 203/42; 203/DIG. 9; 252/632
[58] Field of Search ............ 202/172, 173, 183, 185.2, 202/184, 235, 237, 197; 159/DIG. 12, 21, 27 B, 23, 27 D, 27 R; 203/42, 40, 71, 84, DIG. 9; 252/301.1 W, 632

[56] References Cited

U.S. PATENT DOCUMENTS

| | | | |
|---|---|---|---|
| 1,004,087 | 9/1911 | Scheinemann | 159/27 D |
| 1,486,387 | 3/1924 | Lebermuth | 159/27 B |
| 3,177,129 | 4/1965 | Huckins | 159/27 B |
| 3,293,151 | 12/1966 | Holzer et al. | 159/DIG. 12 |
| 3,480,515 | 11/1969 | Goeldner | 203/42 |
| 3,699,007 | 10/1972 | Picek et al. | 203/42 |
| 3,954,566 | 5/1976 | Rajakovics | 159/DIG. 12 |
| 3,997,389 | 12/1976 | Winkler | 159/27 D |

FOREIGN PATENT DOCUMENTS

| | | | |
|---|---|---|---|
| 3006127 | 8/1981 | Fed. Rep. of Germany | 159/DIG. 12 |
| 883447 | 11/1961 | United Kingdom | 159/DIG. 12 |

*Primary Examiner*—Wilbur Bascomb
*Attorney, Agent, or Firm*—Ladas & Parry

[57] ABSTRACT

A method of treating a liquid containing radioactive contaminants to produce a vapor containing a reduced amount of radioactive contaminant wherein continuous evaporation is effected in a vessel comprising two interconnected sections, one surrounding the other, the degree of evaporation in the inner section being greater than in the outer section thereof resulting in a greater concentration of radioactive material in the inner section.

The outer evaporation section acts as a shield to reduce the release of radiation from the concentration of radioactive materials in the inner section.

1 Claim, 2 Drawing Figures

METHOD OF CONTINUOUS DECONTAMINATION OF RADIOCONTAMINATED LIQUIDS BY DISTILLATION

FIELD OF THE INVENTION

This invention relates to the art of reprocessing liquid containing radioactive material formed in the course of operation of nuclear power plants and radiochemical laboratories. More particularly, the invention concerns a method of continuous evaporation of radiocontaminated liquids by evaporation and apparatus for effecting such a method.

The invention can find application in nuclear power industry for evaporation of liquid containing radioactive material and obtaining high-quality washed vapor during evaporation of such liquids.

BACKGROUND OF THE INVENTION

One important aspect of ensuring reliable and safe operation of nuclear power plants includes reprocessing liquid containing radioactive material resulting from their service. Evaporation is a method normally employed for reprocessing radiocontaminated liquids. During evaporation the liquid is subjected to evaporation whereby concentration of radioactive contaminants contained in the liquid is considerably increased. Therefore, as a result of evaporation the liquid containing radioactive material is greatly reduced in volume which simplifies its subsequent treatment.

The use of the evaporation process posses two problems, particularly the organization of biological protection to ensure the safety of attending personnel and obtaining a high quality vapor for further utilization in the nuclear power plants.

Normally, biological shielding is installed around evaporators intended for reprocessing liquid containing radioactive material and generally has the form of concrete walls and encasements, whereas high quality of vapour is attained by using in the evaporators means for vapor washing. Therewith, the higher is the concentration of radioactive contaminants in the liquid, the higher is the radiation level at the surface of the evaporator and the lower is the quality of vapor obtained. As a consequence, the biological shielding must be thicker and the means for vapor washing more elaborate.

There is known a method of continuous evaporation of liquid containing radioactive material by evaporation residing in passing the liquid containing radioactive material through one evaporation zone, discharging the liquid containing highly concentrated radioactive contaminants and washing the vapor generated in the course of the process (cf. L. S. Sterman, S. A. Tevlin and A. T. Sharkov "Teplovye i atomnye elektrostantsii"—Steam and Nuclear Power Plants, in Russian, the Energoizdat Publishers, 1982, p.166, FIG. 9.30). This method, however, suffers from a disadvantage in that the biological shielding must enclose the entire evaporation zone during the treatment process, which entails the use of a very bulky biological protection assembly.

There is known another method of continuous evaporation of radiocontaminated liquids by evaporation comprising successive passing of a continuously fed radiocontaminated liquid through two evaporation zones isolated from the outside by a layer or body of liquid to prevent radioactive radiation for successively increasing the concentration of radioactive contaminants present in the liquid, discharging the liquid containing the concentrated radioactive contaminants from the second evaporation zone, washing the vapor produced in each of the two evaporation zones to remove the radioactive contaminants present in the vapor, and discharging the thus washed vapor (cf. above L. S. Sterman en al . . . p. 167, FIG. 9.31b).

Compared with the previously described prior art method, the lastdescribed one is advantageous in that the highest concentration of radioactive contaminants is attained in the second evaporation zone, rather than in the entire volume or flow of the liquid being treated. In view of this fact, the biological shielding of the first evaporation zone, wherein concentration of radioactive contaminants and consequently the level of radioactive radiation are lower than in the first evaporation zone, may be less bulky.

However, at a high concentration of radioactive contaminants in the liquid being processed, radioactive radiation from the second evaporation zone to the outside is increased, which hampers a further concentration of radioactive contaminants in the liquid without a more reliable biological shielding, which either affects the efficiency of the apparatus for continuous evaporation of liquid containing radioactive material or requires a more thorough and reliable biological shielding.

There is known an evaporator comprising a housing having pipes for feeding and discharging a heating medium, a pipe for discharging a vapor produced in the evaporator, and pipes for admitting and discharging a liquid being treated. The housing accommodates a tubular heating chamber and a means for vapor purification (cf. L. S. Sterman "Ispariteli"—Evaporators, in Russian, the Mashgiz Publishers, Moscow, 1956, pp. 16 and 17, FIG. 4).

The above evaporator is arranged horizontally, whereby the quality of vapor obtained is not sufficiently high due to the impossibility of employing effective means for vapor washing requiring considerable space inside the evaporator housing. In addition, the horizontal arrangement of the evaporator requires much production area.

These disadvantages are partially obviated in a system of continuous evaporation of liquid containing radioactive material comprised of two intercommunicable vertical evaporators (cf. L. S. Sterman "Ispariteli" . . . , pp. 22 to 24, FIG. 10).

This system does not need a strong biological shielding for the two evaporation zones, since the high degree of concentration of radioactive contaminants and consequently high level of radiation are associated exclusively with the second evaporation zone, that is the second evaporator.

However, biological shielding of the second evaporator must be reliable enough to ensure safe working conditions for the attending personnel when concentration of the radioactive contaminants in the liquid being treated is high.

One more apparatus (evaporator) for continuous evaporation of liquid containing radioactive material which bears the closest resemblance to the one to be described in the present specification is known to comprise a vertical housing having pipes for feeding a liquid containing radioactive material, pipes for feeding and discharging a heating medium and a pipe for discharging vapor generated in the evaporator. The apparatus accommodates a tubular heating chamber and an evaporation chamber containing some of the tubes of the tubular heating chamber, made open in the upper section for making way to the vapor escaping to the interior of the housing and provided with a means for feeding thereinto the liquid being treated and a pipe for discharging the liquid outside the housing; a means for vapor washing being provided above the heating and evaporation chambers (cf. British Pat. No. 1,347,354, IPC B 01 D 1/12, 1/26, published 1974).

The evaporation chamber is defined by radially extending partitions separating a section of the housing interior including some of the tubes of the heating chamber and some of the volume occupied by the liquid being treated. Upper ribs of the partitions are arranged to overlie the level of liquid being treated. In this manner two evaporation zones are provided in one evaporator.

The liquid to be treated is supplied to the housing where it is partially evaporated whereafter the liquid is fed through a port provided in the partition to the evaporation chamber for further evaporation.

As distinct from the heretofore described prior art apparatus, highly concentrated contaminants tend to collect in the evaporation chamber rather than in the entire interior of the apparatus.

In view of the foregoing arrangement, increased radioactive radiation through the housing of the apparatus to the outside will occur only in the portion thereof where the evaporation chamber is disposed.

Because a substantial increase in the concentration of the radioactive contaminants fails to occur throughout the entire volume of the evaporator, the average concentration of these contaminants in the liquid occupying the interior of the evaporator is considerably lower than in the previously described prior art apparatus. Taking account of the fact that radioactivity of vapor is determined by concentration of the radioactive contaminants in the droplets of liquid carried by the vapor from the liquid being treated, a higher quality of vapor is attained in this apparatus. However, due to the increased concentration of radioactive contaminants in the location where the evaporation chamber is disposed, a more formidable biological shielding is required, which in turn leads to more expences for the construction of the apparatus. In addition, another disadvantage resides in that the quality of vapor is still not sufficient because this vapor carries from the evaporation chamber to the interior of the housing droplets of liquid containing concentrated radioactive contaminants.

SUMMARY OF THE INVENTION

It is an object of the present invention to provide a more efficient method of continuous evaporation of liquid containing radioactive material by evaporation.

Another object of the invention is to provide an apparatus for continuous evaporation of radiocontaminated liquids ensuring a substantial reduction of liquid containing radioactive material through the housing of the apparatus and capable of obtaining vapor of higher quality.

The objects and attending advantages are attained by that in a method of continuous evaporation of liquids by evaporation residing in successively passing a continuously fed liquid containing radioactive material through two evaporation zones isolated from the outside by a body of such liquid to prevent radioactive radiation to the outside for successively increasing the concentration of radioactive contaminants present in the liquid, discharging the liquid containing concentrated radioactive contaminants from a second evaporation zone, and washing vapor generated in each evaporation zone to remove the radioactive contaminants present therein, according to the invention, the second evaporation zone wherein a higher degree of concentration of radioactive contaminants is attained as compared with the first evaporation zone is accommodated inside the first evaporation zone, the liquid being decontaminated which is fed to the first evaporation zone is used as a body of liquid preventing the passage of radioactive radiation from the second or inner evaporation zone to the outside.

The objects of the invention are also attained by that in an apparatus for continuous evaporation of liquid containing radioactive material by evaporation comprising a vertical housing having pipes for feeding a liquid containing radioactive material, feeding and discharging a heating medium and discharging vapor, this vertical housing also accommodating a tubular heating chamber and an evaporation chamber containing some of the tubes of the tubular heating chamber, the evaporation chamber beins open in its upper portion for letting out vapor generated therein to the interior of the housing and provided with a means for feeding thereinto from the interior of the housing the liquid being decontaminated and having a pipe for discharging the liquid outside of the housing, a means for vapor washing being provided above the tubular heating chamber and evaporation chamber, according to the invention, the evaporation chamber is defined by two shells of equal diameter arranged substantially coaxially with the tubular heating chamber and secured to its upper and lower faces and by those of the tubes of the heating chamber the ends of which are disposed inside the shells, the lower shell having a bottom portion.

Preferably, the means for feeding the liquid to be treated from the housing to the evaporation chamber is fashioned as at least one port arranged in the lower shell, whereas accommodated inside this shell substantially axially therewith is a cowl, a guiding baffle being provided above each such port on the lower shell.

Advisably, the apparatus further comprises an additional means for vapor washing secured on the upper shell of the evaporation chamber.

The herein proposed method of continuous evaporation of liquid containing radioactive material enables to reduce the amount of biological protection through using as a biological shielding a body of liquid containing radioactive material surrounding the evaporation zone in which the radioactive contaminants present in the liquid being treated are concentrated. In view of the foregoing, the conventional biological protection used for shielding the outer evaporation zone may be reduced or dispensed with depending on the degree of required final concentration of radioactive contaminants in the liquid being treated. As a result, the amount of materials to be used for the construction of the evaporation of apparatus and the production area occupied thereby are substantially reduced which is advantageous when such apparatus is to be employed in nuclear power industry.

In addition, the arrangement of the zone in which a higher concentration of radioactive contaminants in the liquid is obtained inside the evaporation zone of much lower degree of concentration of radioactive contaminants affords to attain a higher quality of vapor, since more vapor is produced in the outer evaporation zone where degree of concentration of radioactive contaminants in the droplets of liquid carried by the vapor is much lower. It is also possible to attain a higher quality of vapor through using an additional means for vapor washing mountable inside the inner evaporation zone, whereby the thus washed vapor can be used in the nuclear power plant processes without aftertreatment.

BRIEF DESCRIPTION OF THE DRAWINGS

The invention will now be described in greater detail with reference to specific embodiments thereof taken in conjunction with the accompanying drawings, in which.

DETAILED DESCRIPTION OF THE INVENTION

Figure 1:
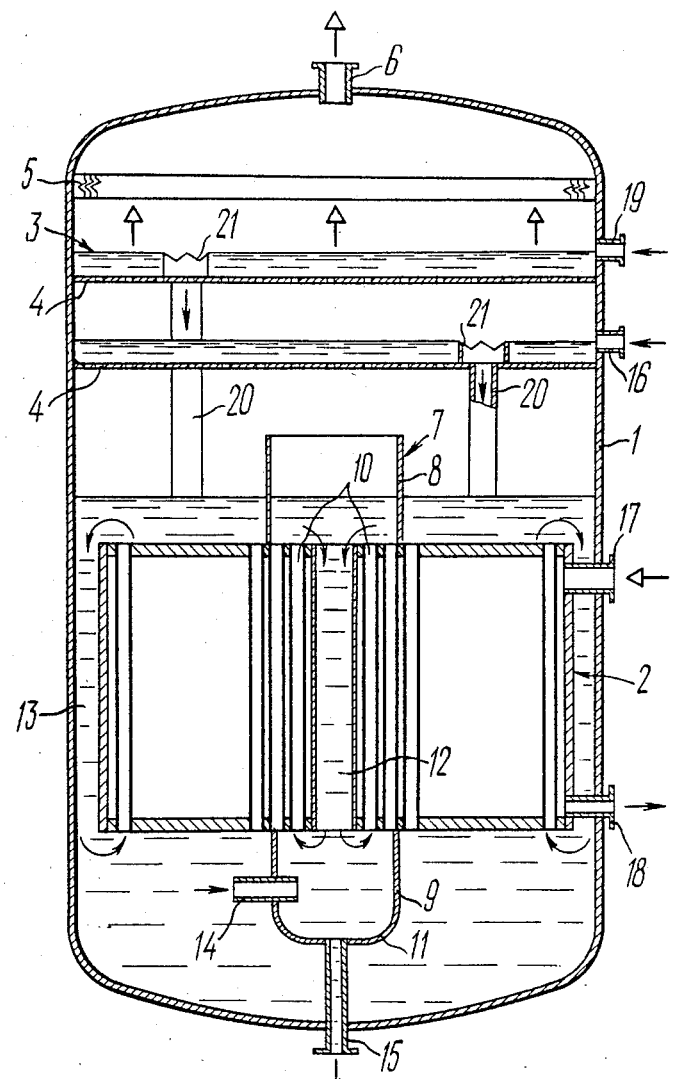
FIG. 1 is a longitudinal sectional view of an apparatus for continuous evaporation of liquid containing radioactive material embodying the present invention.

A method of continuous evaporation of liquid containing radioactive material by evaporation resides in successively passing a continuously fed liquid containing radioactive material through two evaporation zones isolated from the outside by a body of such liquid to prevent radiation for successively increasing the concentration of radioactive contaminants present in this liquid. A second evaporation zone, wherein a higher concentration of radioactive contaminants in the liquid is obtained as compared with the first evaporation zone, is accommodated inside this first evaporation zone, the latter zone being used as the body of liquid preventing radioactive radiation from the inner or second evaporation zone to the outside.

The liquid containing concentrated radioactive contaminants is discharged from the inner evaporation zone and vapor generated in each of the two evaporation zones is washed of radioactive contaminants present therein and discharged for further use.

A device for continuous evaporation of liquid containing radioactive material for effecting the method of the invention comprises a vertical housing 1 (FIG. 1), a lower portion of which containing a liquid to be treated includes a tubular heating chamber 2 providing an outer evaporation zone.

Overlying the heating chamber 2 in the upper portion of the housing 1 is a means 3 for vapor washing which comprises in the embodiment presently described two perforated plates 4 arranged horizontally one above the other and secured still above the two plates 4 a separator 5 in the form of a horizontal baffle plate. The perforated plates 4 act to wash the vapor, whereas the separator 5 is intended to dry the vapor. A vapor discharge tube 6 is provided in the top portion of the housing 1 above the separator 5.

The lower half of the housing 1 accommodates and evaporation chamber 7 defined by two shells 8 and 9 of equal diameter arranged substantially coaxially with the tubular heating chamber 2 and secured correspondingly on the upper and lower end faces of the heating chamber 2 and likewise coaxially relative to some of tubes 10 of this heating chamber 2 with ends of such tubes 10 accommodated inside the shells 8 and 9. The lower shell 9 has a bottom indicated by 11. A cavity confined by the upper and lower shells 8 and 9 and the pipes 10 of the heating chamber 2 define an inner evaporation zone.

The evaporation chamber 7 is provided with a means for circulating the liquid being treated, this means being fashioned as a passage 12 communicating the cavities defined by the upper and lower shells 8 and 9. In the modification under consideration the passage 12 is formed by a tube of the heating chamber 2, this tube having a diameter substantially greater than the diameter of the other tubes 10 of the chamber 2 and being arranged coaxially with the heating chamber 2.

An annular downcomer or space 13 is provided between the tubular heating chamber 2 and the side walls of the housing 1 to facilitate the circulation of the liquid being treated.

In order to obviate possible irregularities in the circulation of the liquid being treated inside the evaporation chamber 7, the means for circulating the liquid may be fashioned as a pipe (not shown) arranged outside the housing 1 to provide the outer portion of such a pipe with a pump, a cooler, a throttling valve or the like.

The evaporation chamber 7 communicates with the interior of the housing 1 in the lower portion thereof through a means for feeding the liquid being treated from the interior of the housing to the evaporation chamber, in this case a short pipe 14. The evaporation chamber 7 also has a pipe 15 for letting out the fluid containing concentrated radioactive contaminants outside the housing 1.

The housing 1 is further provided with a pipe 16 for admitting the liquid containing radioactive material; in the modification under discussion this liquid is fed onto the lower perforated plate 4 to provide for primary vapor washing. Also, the housing 1 has pipes 17 and 18 for feeding and discharging a heating medium, respectively, and a pipe 19 for feeding the liquid to the upper perforated plate 4 for repeated vapor washing. The perforated plates 4 are adapted to communicate with the lower portion of the housing 1 through pipes 20. Sleeves 21 are provided in locations where the pipes 20 are attached to the plates 4, the height of these sleeves determining the level of liquid fed onto the plates 4 for vapor washing.

In the modification of the device for effecting the method of the invention described heretofore the means 3 for vapor washing is used both for washing the vapor generated in the inner evaporation zone and the vapor produced in the outer evaporation zone.

Alternatively, another modified form of the apparatus for continuous evaporation of radiocontaminated liquids is possible, which is essentially similar to the aforedescribed, except that for improved vapor washing in the inner evaporation zone overlying the upper shell 8 (FIG. 2) of the evaporation chamber 7 an additional means 22 is provided for washing the vapor carrying concentrated radioactive contaminants. The means 22 is fashioned and functions similarly to what has been described with reference to the separator 5.

To facilitate circulation of the liquid being treated inside the evaporation chamber 7 and prevent possible irregularities in the flow of liquid through the tubes 10 of the heating chamber 2, the means for feeding the liquid being treated from the housing 1 to the evaporation chamber 7 must include at least one port in the lower shell 9; in the presently described modification this means has two such ports 23 arranged in opposition to each other. A cowl 24 is installed inside the shell 9 axially therewith, whereas flow guiding baffles 25 are provided above the ports 23.

The apparatus for continuous evaporation of liquid containing radioactive material liquids operates as follows. A liquid containing radioactive material is continuously fed to the housing 1 (FIG. 1) through the pipe 16 onto the lower perforated plate 4. The liquid is then caused to flow via the pipe 20 to the lower portion of the housing 1 which is actually the outer evaporation zone and thereafter through the pipe 14 to the evaporation chamber 7. The liquid to be treated is fed to the interior of the housing 1 and consequently to the chamber 7 such that its level is above the upper end face of the tubular heating chamber 2. Concurrently with the supply of the liquid to be treated to the innertube space of the heating chamber 2, a heating medium is admitted to the tubes through the pipe 17. Water steam is normally used as the heating medium, which water steam while being condensed tends to transfer its heat to the liquid being treated conveyed through the heating chamber 2. Condensate is discharged through the pipe 18.

As a result of heating, vapor bubbles are formed in the tubes of the tubular heating chamber 2 which ascend toward the upper end face of the heating chamber 2 to pass through the layer of vapor washing liquid above the tubular heating chamber 2, whereby the vapor is separated from the liquid and ascends to the upper portion of the housing 1.

While ascending along the tubes of the tubular heating chamber 2 the vapor bubbles tend to entrain droplets of the liquid being treated. Having passed with the vapor the tubular heating chamber 2, the liquid being treated moves from the outer evaporation zone to the annular space 13 between the housing 1 and the shell 8 of the tubular heating chamber 2 to thereby flow along this annular space 13 downwards to the lower end face of the tubular heating chamber 2 completing the natural circulation of the liquid being treated.

In the evaporation chamber 7 circulation of the liquid being treated is effected in a generally similar manner, the passage 12 being used as a flow downcomer.

During the formation and removal of vapor, concentration of radioactive contaminants admitted to the interior of the housing 1 together with the liquid is increased. Such an increase in the concentration of radioactive contaminants in the outer evaporation zone is not very pronounced, whereas in the liquid admitted to the chamber 7 this increase in concentration is quite considerable, since final evaporation of the liquid being treated occurs here. The liquid with high concentration of radioactive contaminants is then discharged through the outlet pipe 15. By virtue of the fact that the evaporation chamber 7 is disposed inside the housing 1 coaxially therewith, the portion of the liquid being treated surrounding the chamber 7 has a lower concentration of radioactive contaminants. The body of liquid with low concentration of radioactive contaminants acts to shield the chamber 7 to thereby reduce the level of radioactive radiation at the surface of the housing 1 and therefore functions as a biological protection. In addition, vapor formed in the outer evaporation zone carries liquid with a relatively low radioactive concentration whereby high quality of vapor is attained.

Prior to being discharged from the housing 1 through the pipe 6 the vapor is passed through the means 3 for vapor washing comprised of the upper and lower perforated plates 4 and the separator 5. A layer of liquid is formed on the perforated plates 4, the level of this layer depending on the height of the sleeves 21. The layer of liquid on the lower perforated plate 4 is formed by the liquid being treated, whereas the layer of liquid on the upper perforated plate 4 is formed by the liquid fed through the pipe 19 for vapor washing. The liquid fed for vapor washing is admitted to the lower portion of the housing 1 via the pipe 20.

The vapor formed in the two evaporation zones passes through the perforations of the washing plates 4, bubbles through the layer of liquid on the plates 4 to be washed and relieved of droplets of liquid carried from the body of liquid being treated.

Primary vapor washing is effected at the lower perforated plate 4, the upper perforated plate 4 serving to effect the final vapor washing. The efficiency of vapor washing depends on the level of the liquid on the perforated plates 4, this efficiency being greater at a higher level of the liquid on the perforated plates 4.

The level of liquid on the perforated plates 4 is determined by the height of the sleeves 21.

The washing vapor is caused to pass through the separator 5 wherein droplets of liquid carried by the vapor from the perforated plates 4 are separated.

Figure 2:
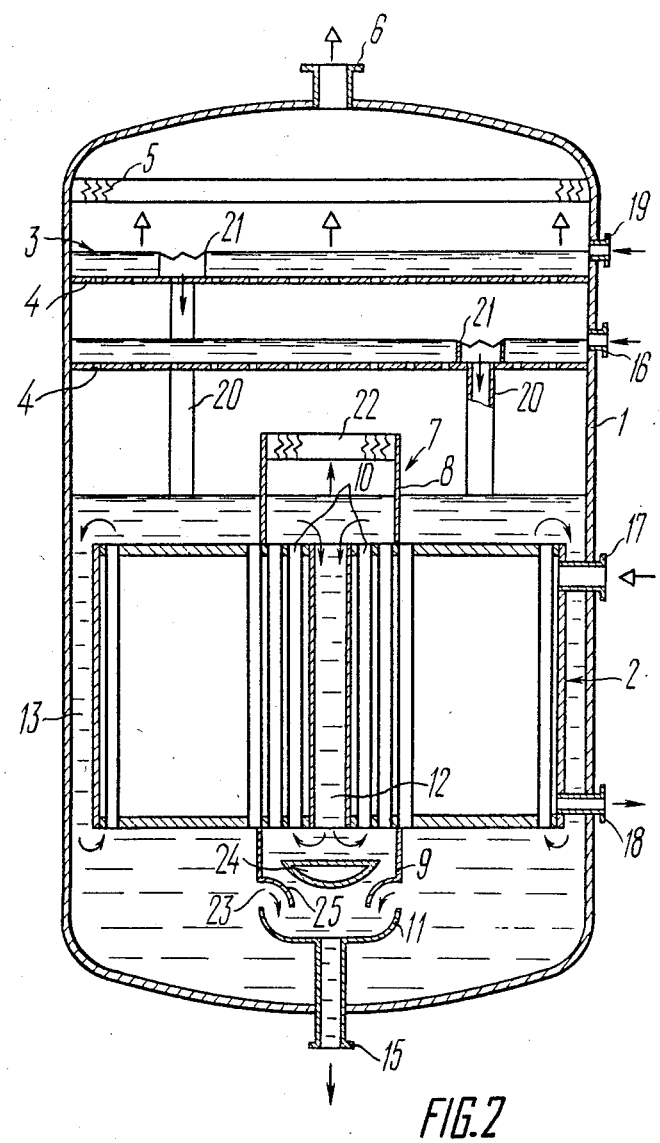
FIG. 2 is a longitudinal sectional view of a modified form of the apparatus for continuous evaporation of liquid containing radioactive material having a means for feeding the liquid being treated from the interior of the housing to an evaporation zone, this means being fashioned as ports in a lower shell of the evaporation chamber.

The modification of the apparatus for continuous evaporation of liquid containing radioactive material represented in FIG. 2 operates similarly to what has been described with reference to the apparatus shown in FIG. 1, the difference residing in that vapor formed in the chamber 7 (FIG. 2), wherein the concentration of radioactive contaminants is higher than in the outer evaporation zone, is first washed in the separator 22 and thereafter in the separator 5.

The additional washing of vapor generated in the evaporation chamber 7 enables to finally attain a higher quality of vapor.

Also, the use of the means for feeding the liquid to be treated from the housing 1 to the chamber 7 in the form of ports 23 with flow guiding baffles 25 secured thereabove and the provision of the cowl 24 make it possible to straighten the flow of liquid relative to the tubes 10 of the tubular heating chamber 2 which provides for more efficient circulation of the liquid being treated in the chamber 7 and increased rate of evaporation.

What is claimed is:

1. A method of continuous evaporation of liquid containing radioactive materials so as to produce vapor reduced of its content of radioactive materials as compared to the starting liquid, which comprises the following steps:

continuously feeding a liquid which contains radioactive materials to a first evaporation zone isolated from the outside for increasing the concentration or radioactive materials in this liquid;

continuously feeding the liquid being treated from said first evaporation zone to a second evaporation zone for increasing still further the concentration of radioactive materials in the liquid as compared with the first evaporation zone, said second evaporation zone being surrounded by said first evaporation zone;

using the liquid being treated supplied to said first evaporation zone, which is in fact an outer evaporation zone, as a body of liquid preventing the passage of radioactive radiation from said second evaporation zone, which is in fact an inner evaporation zone, to the outside;

discharging the liquid containing concentrated radioactive materials from said inner evaporation zone;

washing vapor generated in said outer and inner evaporation zones to remove therefrom radioactive materials and discharging the thus washed vapor.

* * * * *